United States Patent
Wong et al.

(10) Patent No.: US 7,779,744 B2
(45) Date of Patent: Aug. 24, 2010

(54) VEHICULAR HYDRAULIC SYSTEM WITH PRIORITY VALVE

(75) Inventors: Albert C. Wong, Saginaw, MI (US); James L. Davison, Freeland, MI (US); Rick L. Lincoln, Linwood, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 307 days.

(21) Appl. No.: 11/901,822

(22) Filed: Sep. 19, 2007

(65) Prior Publication Data

US 2008/0066461 A1    Mar. 20, 2008

Related U.S. Application Data

(60) Provisional application No. 60/845,892, filed on Sep. 20, 2006.

(51) Int. Cl.
F15B 13/06    (2006.01)
(52) U.S. Cl. .......................................................... 91/516
(58) Field of Classification Search .................... 91/516
See application file for complete search history.

(56) References Cited

U.S. PATENT DOCUMENTS

| | | |
|---|---|---|
| 3,050,944 A | 8/1962 | Schwartz et al. |
| 3,633,363 A | 1/1972 | Larsen |
| 3,662,548 A | 5/1972 | Suzuki et al. |
| 3,785,393 A | 1/1974 | Tanguy |
| 3,879,948 A | 4/1975 | Flory |
| 3,915,186 A | 10/1975 | Thomas |
| 3,941,142 A | 3/1976 | Adachi et al. |
| 4,070,858 A | 1/1978 | Hand |
| 4,074,528 A | 2/1978 | Lourigan et al. |
| 4,075,840 A | 2/1978 | Jesswein |
| 4,139,988 A | 2/1979 | Adachi |
| 4,161,867 A | 7/1979 | Adachi |
| 4,174,018 A | 11/1979 | Liebert et al. |
| 4,181,371 A | 1/1980 | Adachi |
| 4,251,193 A | 2/1981 | Minnis et al. |
| 4,253,382 A | 3/1981 | Yip |
| 4,414,809 A | 11/1983 | Burris |
| 4,420,934 A | 12/1983 | Udono |
| 4,620,750 A | 11/1986 | Leiber |
| 4,967,643 A | 11/1990 | Siegel |
| 5,385,455 A | 1/1995 | Dinsmore et al. |
| 5,471,838 A | 12/1995 | Suzuki et al. |
| 5,535,845 A | 7/1996 | Buschur |
| 5,651,665 A | 7/1997 | Can et al. |

(Continued)

*Primary Examiner*—F. Daniel Lopez
(74) *Attorney, Agent, or Firm*—Cantor Colburn LLP

(57) ABSTRACT

A vehicular hydraulic system with a pump and first and second hydraulic applications arranged in series. A valve is disposed whereby fluid from the pump flows through an inlet port, primary flow channel and outlet port of the valve to the first hydraulic application. The valve includes a body and a valve member that axially slides within an elongate valve chamber, partitioning the primary flow channel from a low pressure volume. The valve also includes a low pressure port and a bypass port. The bypass port is sealed from fluid communication with the valve chamber in a first position and is in fluid communication with the primary flow channel when the valve member is biased into a second position by a threshold exceeding elevated fluid pressure in the primary flow channel. Fluid discharged from the bypass port is diverted past the first application to the second application.

6 Claims, 2 Drawing Sheets

U.S. PATENT DOCUMENTS

| | | |
|---|---|---|
| 5,802,848 A | 9/1998 | McClendon et al. |
| 5,881,630 A | 3/1999 | Buschur et al. |
| 5,960,628 A | 10/1999 | Machesney et al. |
| 6,016,657 A | 1/2000 | Buschur |
| 6,343,469 B1 | 2/2002 | Penninger et al. |
| 6,814,413 B2 | 11/2004 | Davison et al. |
| 6,959,639 B2 * | 11/2005 | Nagumo et al. ............... 91/516 |
| 7,155,907 B2 | 1/2007 | Desjardins et al. |

* cited by examiner

VEHICULAR HYDRAULIC SYSTEM WITH PRIORITY VALVE

CROSS REFERENCE TO RELATED APPLICATIONS

This application claims priority under 35 U.S.C. 119(e) of U.S. provisional patent application Ser. No. 60/845,892 filed on Sep. 20, 2006 entitled VEHICULAR HYDRAULIC SYSTEM WITH PRIORITY VALVE the disclosure of which is hereby incorporated herein by reference.

BACKGROUND OF THE INVENTION

1. Field of the Invention

The present invention relates to hydraulic systems for vehicles and, more particularly, to a hydraulic system having a hydraulic fluid pump and at least two hydraulic devices or sub-circuits.

2. Description of the Related Art

Many trucks with hydraulic braking systems, particularly larger gasoline powered and diesel powered trucks, incorporate hydraulic braking assist systems, rather than vacuum assist systems commonly found in passenger automobiles. The use of vacuum assist braking systems can be problematic in vehicles having a turbo-charged engine and such vehicles will also often employ hydraulic braking assist systems. Furthermore, there is an aftermarket demand for hydraulic braking assist systems for vehicles, such as hotrods, that may not otherwise have a brake assist device or for which the use of a vacuum assist system presents difficulties. Such hydraulic braking assist systems are well known and sold commercially.

Typically, these hydraulic braking assist systems are connected in series between the steering gear and hydraulic pump and use flow from the pump to generate the necessary pressure to provide brake assist as needed. The flow from the pump is generally confined within a narrow range of flow rates and is not intentionally varied to meet changing vehicle operating conditions. Because of the series arrangement, the application of the brakes and engagement of the hydraulic braking assist system can affect the flow of hydraulic fluid to the steering gear, thereby affecting the amount of assist available to the steering gear. Specifically, when a heavy braking load is applied, it causes an increase in backpressure to the pump which can exceed a threshold relief pressure (e.g., 1,500 psi) of the pump. Above this level, a bypass valve of the pump opens to divert a fraction of the outflow back to the intake of the pump, where the cycle continues until the pressure from the brake assist device drops below the threshold value of the bypass valve. During this relief condition, a diminished flow of fluid is sent to the steering gear which may result in a detectable increase in steering effort by the operator of the vehicle to turn the steering wheel under extreme relief conditions.

To at least partially alleviate this condition, it is possible to place a flow-splitter or priority valve in the hydraulic system to divert a portion of the flow of fluid being discharged from the pump to the steering gear under heavy braking conditions. The disclosure of U.S. Pat. No. 6,814,413 B2 describes the use of such a flow-splitting valve and is hereby incorporated herein by reference. Although the flow-splitters disclosed in U.S. Pat. No. 6,814,413 B2 are effective, they are relatively complex to manufacture and, thus, relatively expensive. A simplified valve structure for use in such a hydraulic system having both a brake assist device and a steering assist device arranged in series is desirable.

SUMMARY OF THE INVENTION

The present invention provides a priority valve having a simplified structure that can be used in a hydraulic system having a first hydraulic application and a second hydraulic application arranged in series and wherein the priority valve diverts a portion of the fluid flow to the second hydraulic application when the first hydraulic application creates a relatively high backpressure.

The present invention comprises, in one form thereof, a vehicular hydraulic system that has a hydraulic circuit with a hydraulic pump, a first hydraulic application and a second hydraulic application arranged in series and in serial order along a primary flow path. The hydraulic circuit also includes a valve having a valve body and a valve member. The valve body defines an elongate valve chamber defining an axis wherein the valve member is axially slidably disposed within the chamber between a first axial position and a second axial position and sealingly partitions the chamber into a primary flow channel and a low pressure volume. The valve body further defines an inlet port in fluid communication with the primary flow channel, an outlet port in fluid communication with the primary flow channel, a low pressure port in fluid communication with the low pressure volume, and a bypass port. The bypass port is disposed at an axially intermediate position with the low pressure port being disposed on one side of the bypass port and the inlet port and the outlet port being disposed on the opposing axial side of the bypass port. The bypass port is sealed from fluid communication with the valve chamber when the valve member is in the first axial position and the bypass port is in fluid communication with the primary flow channel when the valve member is in the second axial position. The valve member is axially displaced from the first axial position to the second axial position when the fluid pressure in the primary flow channel is elevated to a threshold value. The the primary flow channel, the inlet port, the outlet port, the bypass port and the low pressure port are the sole fluid communication channels for fluid communication with the elongate valve chamber defined by the valve. The valve is operably disposed in the hydraulic circuit downstream of the pump and upstream of the first hydraulic application wherein the primary flow path extends from the hydraulic pump to the inlet port, through the primary flow channel and the outlet port of the valve to the first hydraulic application. The bypass port is in fluid communication with the primary flow path at a point downstream of the first hydraulic application and upstream of the second hydraulic application and thereby diverts a portion of the fluid flow to the second hydraulic application when the pressure in the primary flow channel exceeds the threshold value.

In some embodiments of the invention, the valve includes a biasing member which biases the valve member towards the first axial position and a threaded member coupled with the biasing member whereby the externally adjustment of the threaded member adjusts the threshold value at which the bypass port is placed in fluid communication with the primary flow channel.

In still other embodiments of the invention, the first hydraulic application is a hydraulic brake booster device with the second hydraulic application being a hydraulic steering gear device.

An advantage of the present invention is that it provides a priority valve for a hydraulic system having a pump and two hydraulic applications arranged in series wherein the manufacturing complexity of the priority valve is reduced in comparison to known priority valves.

Another advantage of some embodiments of the present invention is that it provides a priority valve wherein the threshold relief pressure can be externally adjusted making any required adjustment of the threshold relief pressure relatively easy to accomplish.

BRIEF DESCRIPTION OF THE DRAWINGS

The above mentioned and other features of this invention, and the manner of attaining them, will become more apparent and the invention itself will be better understood by reference to the following description of an embodiment of the invention taken in conjunction with the accompanying drawings, wherein.

Figure 1:
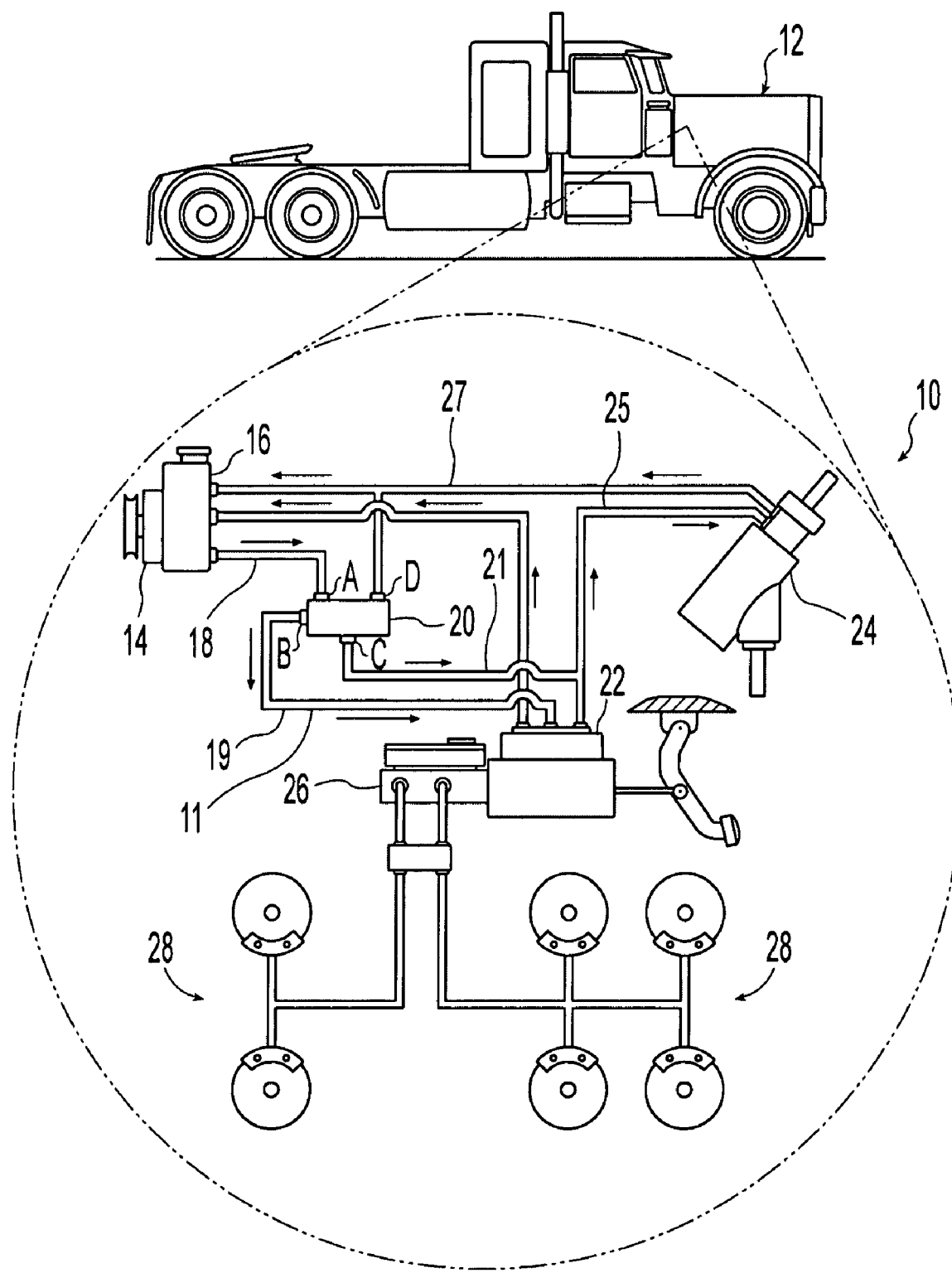
FIG. 1 is a schematic view of a hydraulic system in accordance with the invention.

Corresponding reference characters indicate corresponding parts throughout the several views. Although the exemplification set out herein illustrates an embodiment of the invention, in one form, the embodiment disclosed below is not intended to be exhaustive or to be construed as limiting the scope of the invention to the precise form disclosed.

DETAILED DESCRIPTION OF THE INVENTION

FIG. 1 shows a hydraulic system 10 for a vehicle 12 for assisting in the steering and braking of the vehicle. The hydraulic system includes a hydraulic pump 14 and reservoir 16. The reservoir may be incorporated into the pump 14, as illustrated, or may be located remote from the pump 14.

The pump 14 delivers high pressure hydraulic fluid through discharge line 18 to a flow-splitting valve 20 also known as a priority valve. The priority valve 20, in turn, selectively communicates with a first hydraulic application 22, a second hydraulic application 24, and the reservoir 16, depending on predetermined operating conditions of the system 10, as will be explained below.

The first and second hydraulic applications 22, 24 take the form of a hydraulic device or a hydraulic sub-circuit. In the illustrated embodiment, first application 22 is a hydraulic braking assist system or booster device and the second application 24 is a hydraulic steering gear assist system or device.

The hydraulic brake booster device 22 communicates with a master cylinder 26 and brakes 28 of the braking system and further with the steering assist device 24 through line 25. In the illustrated system 10, hydraulic braking assist device 22 and hydraulic steering gear assist device 24 have relief pressures that are substantially equivalent.

The hydraulic booster device 22 is of a type well known in the art which is disposed in line between the hydraulic pump and the hydraulic master cylinder of a vehicular hydraulic brake system which acts to boost or amplify the force to the brake system in order to reduce brake pedal effort and pedal travel required to apply the brakes as compared with a manual braking system. Such systems are disclosed, for example, in U.S. Pat. No. 4,620,750 and U.S. Pat. No. 4,967,643, the disclosures of which are both incorporated herein by reference, and provide examples of a suitable booster device 22. Briefly, hydraulic fluid from the supply pump 14 is communicated to the booster device 22 through a booster inlet port and is directed through an open center spool valve slideable in a booster cavity (not shown). A power piston slides within an adjacent cylinder and is exposed to a fluid pressure on an input side of the piston and coupled to an output rod on the opposite side. An input reaction rod connected to the brake pedal extends into the housing and is linked to the spool valve via input levers or links. Movement of the input rod moves the spool valve, creating a restriction to the fluid flow and corresponding boost in pressure applied to the power piston. Steering pressure created by the steering gear assist system 24 is isolated from the boost cavity by the spool valve and does not affect braking but does create a steering assist backpressure to the pump 14. The priority valve 20 operates to manage the flow of hydraulic fluid from the pump 14 to each of the brake assist 22 and steering assist 24 systems in a manner that reduces the interdependence of the steering and braking systems on one another for operation.

Figure 2:
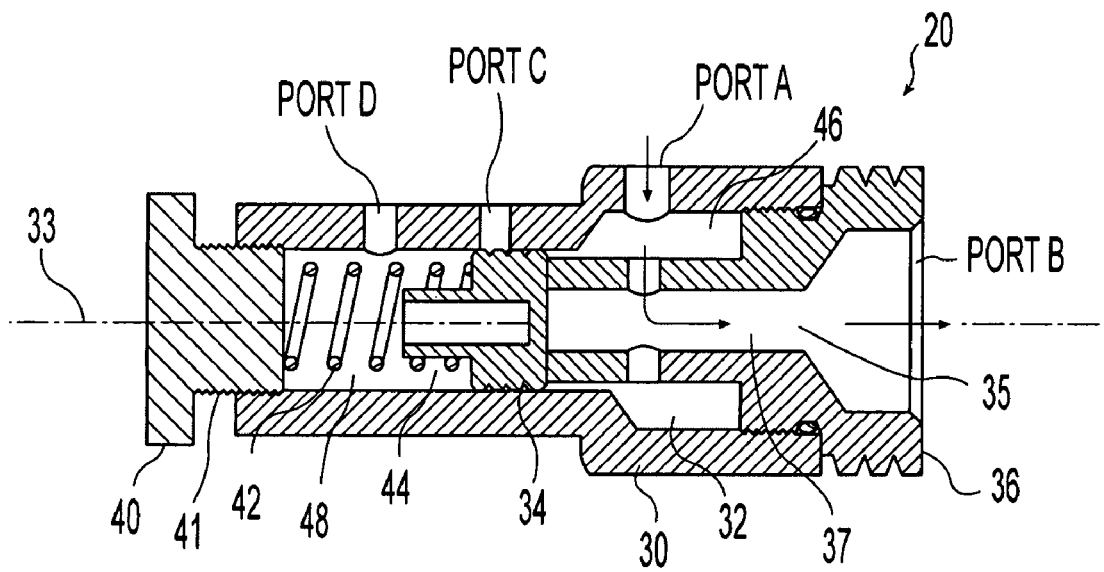
FIG. 2 is a partial cross sectional schematic view of the priority valve under normal flow conditions.
Figure 3:
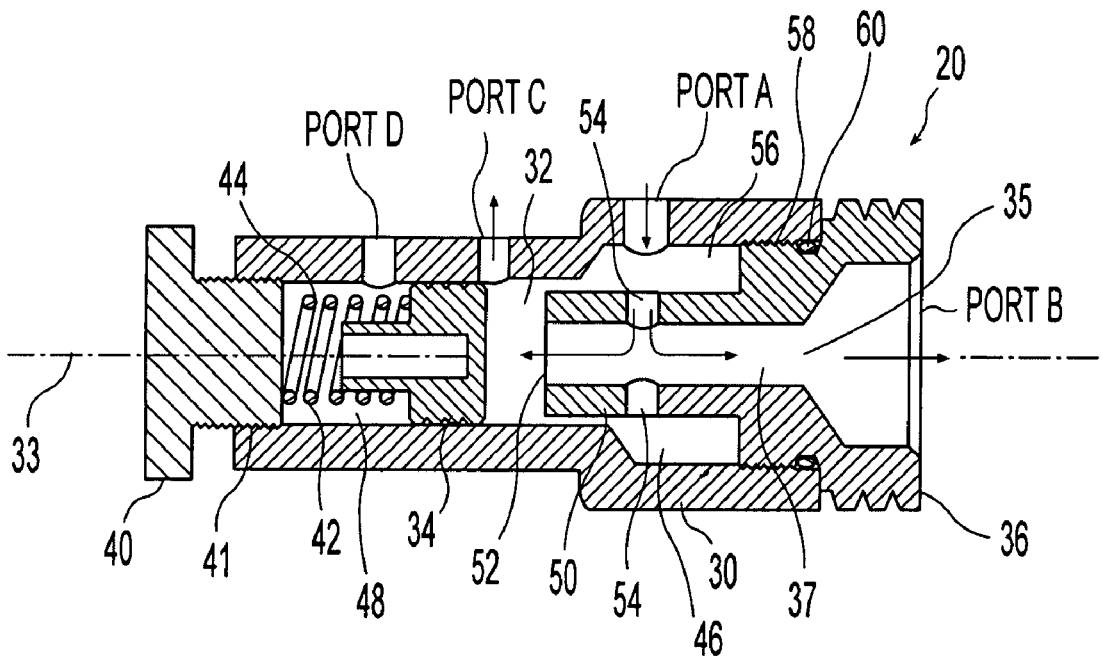
FIG. 3 is a partial cross sectional schematic view of the priority valve of FIG. 2 where the brake assist pressure has reached a control pressure causing a diversion of flow to the steering gear assist device.

With reference to FIGS. 2 and 3, the priority valve 20 includes a valve body 30 having a bore forming a valve chamber 32 in which a slideable flow control valve member 34 is accommodated. A plurality of ports are provided in the valve body 30, and are denoted in the Figures as ports A (inlet port), B (outlet port), C (bypass port) and D (low pressure port). Fluid from the pump 14 is directed into the valve body 30 through inlet port A, where it enters the valve chamber 32 and is directed out of the body 30 through one or more of the outlet ports B, C and D, depending upon the operating conditions which will now be described.

FIG. 2 shows normal operation of the priority valve 20 under conditions where backpressure from the brake assist device 22 and the backpressure from the steering assist device 24 are below predetermined control pressures. All of the flow entering port A passes through a primary flow channel 35 of valve 20 and is routed through port B to the hydraulic brake booster 22.

In the normal flow condition illustrated in FIG. 2, both the brake assist 22 and steering assist 24 are operating below the predetermined threshold or relief pressure and the fluid flows freely into port A and out port B through the primary flow channel 35. As shown, the valve body 30 may be fitted with a union fitting 36 which extends into the valve chamber 32.

Elongate valve chamber 32 has two cylindrical sections coaxially aligned along axis 33 with a first cylindrical section 46 having a larger diameter than second cylindrical section 48. In the illustrated embodiment, union fitting 36 includes threads 58 engaged with corresponding threads in large cylindrical section 46 of valve chamber 32 and an O-ring 60 to provide a seal. Union fitting 36 also includes a hollow tubular portion 50 with an open end 52 that extends into valve chamber 32. Tubular portion 50 has a smaller outer diameter than the inner diameter of cylindrical section 46 of chamber 32 whereby an interstitial space 56 is defined within valve chamber 32 between tubular portion 50 and valve body 30. Tubular portion 50 also includes sidewall openings 54 which provide fluid communication between interstitial space 56 and the interior 37 of union fitting 36. Inlet port A is in fluid communication with interstitial space 56 while outlet port B is in fluid communication with interior 37 of fitting 36. Thus, the primary fluid channel 35 through valve 20 from port A to port B is defined, in the illustrated embodiment, by interstitial space 56, sidewall openings 54 and interior volume 37 of fitting 36.

The rear volume 44 of valve bore 32 located behind valve member 34 is at a pressure corresponding to the pressure of reservoir 16 which is communicated to rear volume 44 through port D. In the illustrated embodiment, reservoir 16 is disposed downstream of steering gear 24 and upstream of pump 14 and holds hydraulic fluid at a relatively low pressure. Valve member 34 sealingly partitions valve chamber 32 between low pressure volume 44 and primary channel 35 which is in fluid communication with Port B and the head of valve member 34 sealingly separates and prevents the migration of fluid between primary channel 35 and low pressure volume 44. The fluid pressure within rear volume 44 together with biasing force exerted by flow control spring 42 holds the valve 34 forward against the union fitting 36 under normal flow conditions. In this position, illustrated in FIG. 2, the valve 34 seals port C from fluid communication with valve chamber 32 and prevents fluid entering through Port A from leaving through either of the bypass ports C, D. Consequently, when valve 34 is in the position shown in FIG. 2, all of the fluid entering Port A is discharged through Port B and fluid neither enters nor is discharged through either of Ports C or D. Of course, for all real devices, there is some inherent loss of fluid due to clearances between individual parts.

Turning now to FIG. 3, the condition is shown where the brake assist pressure developed by the brake assist device 22 within port B and the primary channel 35 exceeds a predetermined threshold pressure value or control pressure. (The hydraulic fluid in primary channel 35 is exposed to valve member 34 through the open end 52 of union fitting 36 when valve member 34 is in the axial position shown in FIG. 2.) This threshold value is determined by the combination of the fluid pressure within rear volume 44 and the biasing force exerted by spring 42. The threshold pressure is preferably set just below the relief pressure of the pump 14. As the backpressure in primary channel 35 approaches the predetermined threshold pressure, the pressure exerted on valve 34 causes valve 34 to axially slide back against the spring 42 and the fluid pressure in rear volume 44 from the first axial position shown in FIG. 2 to the second axial position shown in FIG. 3 where it is spaced from open end 52 of tubular portion 50. In the position shown in FIG. 3, valve 34 has slid rearwardly to expose bypass Port C to the main flow of fluid discharged by pump 14 coming in through port A. The flow from the pump 14 in through port A will thus be fed to both port B and port C with a significant majority of the flow being delivered directly to the steering assist device 24 through port C, bypassing the brake assist device 22. The flow control valve member 34 thus operates to automatically meter excess oil flow through the gear bypass Port C to prevent the line pressure to the brake assist device 22 from rising above the preset threshold pressure which, as mentioned above, is preferably set just below the relief pressure of pump 14.

Valve 20 provides a flow-splitting or priority valve having a relatively simple and readily manufactured construction with elongate valve chamber 32 and the primary flow channel 35, inlet port A, outlet port B, bypass port C and low pressure port D being the sole fluid communication channels for fluid communication with the elongate valve chamber 32 defined by valve 20. In the illustrated embodiment, elongate valve chamber 32 has two cylindrical sections 46, 48 of differing diameters as mentioned above. Valve member 34 is located in the smaller diameter portion 48 with the primary flow channel 35 extending through the larger diameter portion 46. Ports A and B are in fluid communication with the larger diameter portion 48 while ports C and D are in fluid communication with the smaller diameter portion 46.

In an alternative embodiment, it is envisioned that Port D could be exposed the ambient pressure whereby the control pressure would not be dependent upon the pressure within reservoir 16. In such an alternative embodiment, seals located on valve member 34 would be used to prevent leakage of the hydraulic fluid. Additional seals arranged between the environment and valve member 34 might also be employed to prevent both leakage and the contamination of the hydraulic fluid.

Valve 20 also includes a threaded plug 40 that is operably coupled with biasing member 42. In the illustrated embodiment, as can be seen in FIGS. 2 and 3, biasing member 42 takes the form of a helical spring engaged with valve member 34 at one end and a threaded plug 40 on its opposite end. Plug 40 has helical threads 41 engaged with cooperating threads formed in valve bore 32 and the axial position of plug 40 can be adjusted by rotating plug 40 relative to valve body 30. The use of threaded plug 40 allows the biasing force exerted by spring 42 on valve member 34 to be externally adjusted after assembly of priority valve 20 by simply turning plug 40 relative to valve body 30. In the event that the control pressure value at which valve member 34 first exposes Port C to allow fluid flow from pump 14 to bypass brake assist device 22 requires adjustment after installation of priority valve 20, a threaded plug 40 makes such an adjustment considerably easier. Alternative embodiments of priority valve 20 wherein plug 40 is press fit into valve body 30 and is not externally adjustable or where valve body 30 is provided with a blind bore, are, however, also within the scope of the present invention.

If the pressure within primary channel 35 continues to rise after Port C has been exposed, valve member 34 will continue to slide rearwardly within valve bore 32. While it is possible to design valve bore 32, Port D and valve member 34 such that Port D would eventually be exposed due to such a continued rise in pressure and thereby allow a portion of the fluid flow discharged from pump 14 entering priority valve 20 through Port A to be discharged through Port D and bypass both brake assist device 22 and steering gear assist device 24, the configuration of the illustrated priority valve 20 does not allow valve member 34 to expose Port D.

As evident from the description presented above, hydraulic circuit 10 includes, in series arrangement and in serial order, hydraulic pump 14, valve 20, brake booster device 22, steering gear device 24 and reservoir 16. When valve 20 is not diverting a portion of the fluid flow through port C to bypass brake booster device 22 as occurs when brake booster 22 is generating a relatively high back pressure, a substantial majority of the fluid flow discharged from pump 14 will flow along a primary flow path 11 that extends from the outlet of pump 14, through discharge line 18, through valve 20 from port A to port B along primary flow channel 35, through hydraulic line 19 to brake booster 22, through hydraulic line 25 to steering gear 24, through hydraulic line 27 to reservoir 16 and then to the inlet of pump 14 wherein the cycle is repeated. As described above, when the pressure upstream of brake booster 22 is elevated to a threshold value, valve 20 will split the fluid flow with a portion being communicated to port B in the primary flow path upstream of brake booster 22 and another portion of the fluid flow being diverted through bypass port C to hydraulic line 21 which communicates the fluid to a point in the primary flow path downstream of brake booster 22 and upstream of steering gear device 24.

While the present invention has been described above with reference to a hydraulic system that combines both a steering gear assist device and a brake assist device, it may also be employed with other hydraulic devices and systems. For example, it is known to employ a single hydraulic fluid pump to power the fluid motor of a steering assist device and a second fluid motor associated with a radiator cooling fan. U.S. Pat. No. 5,802,848, for example, discloses a system having a steering gear assist device and a radiator cooling fan with a fluid motor powered by a single hydraulic fluid pump and is incorporated herein by reference. In alternative embodiments of the present invention, the priority valve disclosed herein could be employed to facilitate the use of a single hydraulic fluid pump to power the fluid motors of both a steering gear assist device and that of a radiator cooling fan.

Furthermore, the priority valve of the present system could be used to control the fluid flow associated with two hydraulic devices (e.g., a brake assist device, a steering gear assist device, a radiator fan having a fluid motor, or other hydraulic device), or two hydraulic circuits, wherein the priority valve and the two associated hydraulic devices or circuits, form one portion of a larger complex hydraulic circuit.

While this invention has been described as having an exemplary design, the present invention may be further modified within the spirit and scope of this disclosure. This application is therefore intended to cover any variations, uses, or adaptations of the invention using its general principles.

What is claimed is:

1. A vehicular hydraulic system comprising:
    a hydraulic circuit having, arranged in series and in serial order along a primary flow path, a hydraulic pump, a first hydraulic application, and a second hydraulic application; and
    wherein said hydraulic circuit further includes a valve having a valve body and a valve member; said valve body defining an elongate valve chamber having an axis wherein said valve member is axially slidably disposed within said chamber between a first axial position and a second axial position and sealingly partitions said chamber into a primary flow channel and a low pressure volume;
    said valve body further defining an inlet port in fluid communication with said primary flow channel;
    an outlet port in fluid communication with said primary flow channel, a low pressure port in fluid communication with said low pressure volume and a bypass port, said bypass port being disposed at an axially intermediate position with said low pressure port being disposed on one side of said bypass port and said inlet port and said outlet port being disposed on the opposing axial side of said bypass port, said bypass port being sealed from fluid communication with said valve chamber when said valve member is in said first axial position and said bypass port being in fluid communication with said primary flow channel when said valve member is in said second axial position, said valve member being axially displaced from said first axial position to said second axial position when the fluid pressure in said primary flow channel is elevated to a threshold value, and wherein said primary flow channel, said inlet port, said outlet port, said bypass port and said low pressure port are the sole fluid communication channels for fluid communication with said elongate valve chamber defined by said valve;
    a biasing member disposed within said low pressure volume of said valve and axially biasing said valve member toward said first axial position;
    a threaded member operably coupled with said biasing member, said threaded member being externally axially repositionable wherein axial repositioning of said threaded member adjusts said threshold value; and
    wherein said valve is operably disposed in said hydraulic circuit downstream of said pump and upstream of said first hydraulic application wherein said primary flow path extends from said hydraulic pump to said inlet port, through said primary flow channel and said outlet port of said valve to said first hydraulic application; said bypass port being in fluid communication with said primary flow path at a point downstream of said first hydraulic application and upstream of said second hydraulic application.

2. The vehicular hydraulic system of claim 1, wherein said valve chamber comprises a first substantially cylindrical section and a second substantially cylindrical section wherein said first and second cylindrical sections are disposed coaxially and said first cylindrical section defines a larger diameter than said second cylindrical section;
    said inlet port and said outlet port being in fluid communication with said first cylindrical section, said low pressure port and said bypass port being in fluid communication with said second cylindrical portion;
    a union fitting disposed in said first cylindrical section and defining said outlet port and said primary flow channel therethrough and having a hollow tubular portion with an open end projecting into said first cylindrical section, at least one sidewall opening in said tubular portion providing fluid communication between said primary flow channel and an interstitial space defined between said tubular portion and said first cylindrical section, said inlet port being in fluid communication with said interstitial space, said valve member being engaged with said open end of said tubular portion and in fluid communication with said primary flow channel when said valve member is in said first axial position, said valve member being axially spaced from said open end of said tubular portion when said valve member is in said second axial position;
    said biasing member disposed within said second cylindrical section and biasing said valve member into engagement with said union fitting; and
    said threaded member engaged with said valve body proximate an end of said second cylindrical section and operably coupled with said biasing member, said threaded member being externally axially repositionable wherein axial repositioning of said threaded member adjusts said threshold value.

3. A vehicular hydraulic system comprising:
    a hydraulic circuit having, arranged in series and in serial order along a primary flow path, a hydraulic pump, a first hydraulic application, and a second hydraulic application; and
    wherein said hydraulic circuit further includes a valve having a valve body and a valve member; said valve body defining an elongate valve chamber defining an axis wherein said valve member is axially slidably disposed within said chamber between a first axial position and a second axial position and sealingly partitions said chamber into a primary flow channel and a low pressure volume;
    said valve body further defining an inlet port in fluid communication with said primary flow channel;
    an outlet port in fluid communication with said primary flow channel, a low pressure port in fluid communication with said low pressure volume and a bypass port, said bypass port being disposed at an axially intermediate position with said low pressure port being disposed on one side of said bypass port and said inlet port and said outlet port being disposed on the opposing axial side of said bypass port, said bypass port being sealed from fluid communication with said valve chamber when said valve member is in said first axial position and said bypass port being in fluid communication with said primary flow channel when said valve member is in said second axial position, said valve member being axially displaced from said first axial position to said second axial position when the fluid pressure in said primary flow channel is elevated to a threshold value, and wherein said primary flow channel, said inlet port, said outlet port, said bypass port and said low pressure port are the sole fluid communication channels for fluid communication with said elongate valve chamber defined by said valve;

wherein said valve is operably disposed in said hydraulic circuit downstream of said pump and upstream of said first hydraulic application wherein said primary flow path extends from said hydraulic pump to said inlet port, through said primary flow channel and said outlet port of said valve to said first hydraulic application; said bypass port being in fluid communication with said primary flow path at a point downstream of said first hydraulic application and upstream of said second hydraulic application;

wherein said valve chamber comprises a first substantially cylindrical section and a second substantially cylindrical section wherein said first and second cylindrical sections are disposed coaxially and said first cylindrical section defines a larger diameter than said second cylindrical section;

said inlet sort and said outlet sort being in fluid communication with said first cylindrical section, said low pressure port and said bypass port being in fluid communication with said second cylindrical portion;

a union fitting, disposed in an open end of said first cylinder section, said union fitting defining a fluid channel therethrough and having a hollow tubular portion with an open end projecting into said first cylindrical section, at least one sidewall opening in said tubular portion providing fluid communication between said fluid channel and an interstitial space defined between said tubular portion and said first cylindrical section, said inlet port being in fluid communication with said interstitial space, said valve member being engaged with said open end of said tubular portion and exposed to fluid within said fluid channel when said valve member is in said first axial position, said valve member being axially spaced from said open end of said tubular portion when said valve member is in said second axial position;

a biasing member disposed within said second cylindrical section and biasing said valve member into engagement with said union fitting;

said valve further comprises a threaded member engaged with said valve body proximate an end of said second cylindrical section and operably coupled with said biasing member, said threaded member being externally axially repositionable wherein axial repositioning of said threaded member adjusts said threshold value.

4. A vehicular hydraulic system comprising:

a hydraulic circuit having, arranged in series and in serial order along a primary flow path, a hydraulic pump, a hydraulic brake booster device, and a hydraulic steering gear device; and wherein said hydraulic circuit further includes a valve having a valve body and a valve member; said valve body defining an elongate valve chamber having an axis wherein said valve member is axially slidably disposed within said chamber between a first axial position and a second axial position and sealingly partitions said chamber into a primary flow channel and a low pressure volume;

said valve body further defining an inlet port in fluid communication with said primary flow channel; an outlet port in fluid communication with said primary flow channel, a low pressure port in fluid communication with said low pressure volume and a bypass port, said bypass port being disposed at an axially intermediate position with said low pressure port being disposed on one side of said bypass port and said inlet port and said outlet port being disposed on the opposing axial side of said bypass port, said bypass port being sealed from fluid communication with said valve chamber when said valve member is in said first axial position and said bypass port being in fluid communication with said primary flow channel when said valve member is in said second axial position, said valve member being axially displaced from said first axial position to said second axial position when the fluid pressure in said primary flow channel is elevated to a threshold value, and wherein said primary flow channel, said inlet port, said outlet port, said bypass port and said low pressure port are the sole fluid communication channels for fluid communication with said elongate valve chamber defined by said valve; and a biasing member disposed within said low pressure volume of said valve and biasing said valve member into engagement with said valve body in said low pressure volume;

a threaded member operably coupled with said biasing member, said threaded member being externally axially repositionable wherein axial repositioning of said threaded member adjusts said threshold value;

wherein said valve is operably disposed in said hydraulic circuit downstream of said pump and upstream of said brake booster device wherein said primary flow path extends from said hydraulic pump to said inlet port, through said primary flow channel and said outlet port of said valve to said brake booster device; said bypass port being in fluid communication with said primary flow path at a point downstream of said brake booster device and upstream of said steering gear device.

5. The vehicular hydraulic system of claim 4 wherein said valve chamber comprises a first substantially cylindrical section and a second substantially cylindrical section wherein said first and second cylindrical sections are disposed coaxially and said first cylindrical section defines a larger diameter than said second cylindrical section;

said inlet port and said outlet port being in fluid communication with said first cylindrical section, said low pressure port and said bypass port being in fluid communication with said second cylindrical portion;

a union fitting disposed in said first cylindrical section and defining said outlet port and said primary flow channel therethrough and having a hollow tubular portion with an open end projecting into said first cylindrical section, at least one sidewall opening in said tubular portion providing fluid communication between said primary fluid channel and an interstitial space defined between said tubular portion and said first cylindrical section, said inlet port being in fluid communication with said interstitial space, said valve member being engaged with said open end of said tubular portion and in fluid communication with said primary flow channel when said valve member is in said first axial position, said valve member being axially spaced from said open end of said tubular portion when said valve member is in said second axial position;

said biasing member disposed within said second cylindrical section and biasing said valve member into engagement with said union fitting; and a threaded member engaged with said valve body proximate an end of said second cylindrical section and operably coupled with said biasing member, said threaded member being externally axially repositionable wherein axial repositioning of said threaded member adjusts said threshold value.

6. A vehicular hydraulic system comprising:

a hydraulic circuit having, arranged in series and in serial order along a primary flow path, a hydraulic pump, a hydraulic brake booster device, and a hydraulic steering gear device; and wherein said hydraulic circuit further includes a valve having a valve body and a valve member; said valve body defining an elongate valve chamber defining an axis wherein said valve member is axially slidably disposed within said chamber between a first axial position and a second axial position and sealingly partitions said chamber into a primary flow channel and a low pressure volume;

said valve body further defining an inlet port in fluid communication with said primary flow channel; an outlet port in fluid communication with said primary flow channel, a low pressure port in fluid communication with said low pressure volume and a bypass port, said bypass port being disposed at an axially intermediate position with said low pressure port being disposed on one side of said bypass port and said inlet port and said outlet port being disposed on the opposing axial side of said bypass port, said bypass port being sealed from fluid communication with said valve chamber when said valve member is in said first axial position and said bypass port being in fluid communication with said primary flow channel when said valve member is in said second axial position, said valve member being axially displaced from said first axial position to said second axial position when the fluid pressure in said primary flow channel is elevated to a threshold value, and wherein said primary flow channel, said inlet port, said outlet port, said bypass port and said low pressure port are the sole fluid communication channels for fluid communication with said elongate valve chamber defined by said valve; and wherein said valve is operably disposed in said hydraulic circuit downstream of said pump and upstream of said brake booster device wherein said primary flow path extends from said hydraulic pump to said inlet port, through said primary flow channel and said outlet port of said valve to said brake booster device; said bypass port being in fluid communication with said primary flow path at a point downstream of said brake booster device and upstream of said steering gear device;

said valve chamber comprises a first substantially cylindrical section and a second substantially cylindrical section wherein said first and second cylindrical sections are disposed coaxially and said first cylindrical section defines a larger diameter than said second cylindrical section;

said inlet port and said outlet port being in fluid communication with said first cylindrical section, said low pressure port and said bypass port being in fluid communication with said second cylindrical portion;

a union fitting, disposed in an open end of said first cylinder section, said union fitting defining a fluid channel therethrough and having a hollow tubular portion with an open end projecting into said first cylindrical section, at least one sidewall opening in said tubular portion providing fluid communication between said fluid channel and an interstitial space defined between said tubular portion and said first cylindrical section, said inlet port being in fluid communication with said interstitial space, said valve member being engaged with said open end of said tubular portion and exposed to fluid within said fluid channel when said valve member is in said first axial position, said valve member being axially spaced from said open end of said tubular portion when said valve member is in said second axial position;

a biasing member disposed within said second cylindrical section and biasing said valve member into engagement with said union fitting;

said valve further comprises a threaded member engaged with said valve body proximate an end of said second cylindrical section and operably coupled with said biasing member, said threaded member being externally axially repositionable wherein axial repositioning of said threaded member adjusts said threshold value.

* * * * *